United States Patent
Fukuda et al.

(10) Patent No.: US 8,011,636 B2
(45) Date of Patent: Sep. 6, 2011

(54) ELECTRONIC APPARATUS WITH A STAND

(75) Inventors: Yusuke Fukuda, Koganei (JP);
Tomoharu Iekushi, Musashimurayama (JP)

(73) Assignee: Iwatsu Electric Co., Ltd., Tokyo (JP)

( * ) Notice: Subject to any disclaimer, the term of this patent is extended or adjusted under 35 U.S.C. 154(b) by 406 days.

(21) Appl. No.: 12/238,708

(22) Filed: Sep. 26, 2008

(65) Prior Publication Data

US 2009/0283655 A1 Nov. 19, 2009

(30) Foreign Application Priority Data

May 15, 2008 (JP) .................................. 2008-128275

(51) Int. Cl.
*F16M 11/00* (2006.01)
(52) U.S. Cl. ......... 248/685; 248/923; 248/677; 379/454
(58) Field of Classification Search .................. 248/127, 248/454, 456, 685, 688, 923; 379/445, 454
See application file for complete search history.

(56) References Cited

U.S. PATENT DOCUMENTS

| 4,515,998 | A | * | 5/1985 | Pinede et al. ................. | 379/454 |
| 5,603,480 | A | * | 2/1997 | Chen .............................. | 248/688 |
| 6,045,108 | A | * | 4/2000 | Cziraky ......................... | 248/454 |
| 6,971,622 | B2 | * | 12/2005 | Ziegler et al. ................. | 248/454 |
| 7,104,516 | B2 | * | 9/2006 | Uto et al. ...................... | 248/688 |
| 7,415,108 | B2 | * | 8/2008 | Toh ................................ | 379/445 |
| 7,618,017 | B2 | * | 11/2009 | Mamizuka et al. ........... | 248/677 |
| 7,751,555 | B2 | * | 7/2010 | Yoshida et al. ............... | 379/436 |
| 7,770,864 | B2 | * | 8/2010 | Phifer et al. .................. | 248/455 |
| 2004/0202315 | A1 | * | 10/2004 | Toh ................................ | 379/445 |
| 2007/0235626 | A1 | * | 10/2007 | Mamizuka et al. ........... | 248/677 |

FOREIGN PATENT DOCUMENTS

| JP | 61-93058 | 6/1986 |
| JP | 62-152541 | 9/1987 |
| JP | 02-038627 | 3/1990 |
| JP | 03-26180 | 3/1991 |
| JP | 07-86696 | 3/1995 |
| JP | 10-136071 | 5/1998 |
| JP | 3065530 | 10/1999 |
| JP | 2005-167949 | 6/2005 |
| JP | 2007-096878 | 4/2007 |
| JP | 2007-278497 | 10/2007 |

* cited by examiner

*Primary Examiner* — Terrell McKinnon
*Assistant Examiner* — Daniel J Breslin
(74) *Attorney, Agent, or Firm* — Cozen O'Connor

(57) ABSTRACT

A telephone with a stand has a rear case and a stand leg swingably connected to the rear case. The rear case includes an embossed portion disposed in the center of a back wall thereof, two swing pivots protrudingly arranged in respective lateral faces of the embossed portion, and V-shaped grooves formed in the back face adjacently to the pivots. The stand leg has two main legs and an auxiliary leg connecting the main legs to each other. Each of the main legs has a locking claw protruding from a tip end thereof and engaged with one of the V-shaped grooves, and a guide groove formed in the distal end of the main leg. The guide groove includes a main groove portion extending in the longitudinal direction of the main leg and a sub groove portion orthogonal to the main groove portion.

8 Claims, 22 Drawing Sheets

ELECTRONIC APPARATUS WITH A STAND

BACKGROUND OF THE INVENTION

1. Field of the Invention

The present invention relates to an electronic apparatus such as a telephone, and more specifically to an electronic apparatus having a stand leg for adjusting a setting angle of the electronic apparatus.

2. Description of the Related Art

For example, some electronic apparatuses for desktop or wall hanging use are equipped with stand devices for adjusting the setting angle of the electronic apparatuses when used on desktop. A stand device of this type includes a base that supports an apparatus body so as to be swingable in the vertical direction and a stand leg that is disposed in between the base and the apparatus body and keeps the apparatus body at a given setting angle with respect to the base. Such a stand device contains a lot of components, and therefore incurs a reduction in manufacturing efficiency of electronic apparatuses and an increase in manufacturing costs. Moreover, as the base is an essential component to the stand device, the stand device restricts the freedom of the exterior design of the electronic apparatus.

On the other hand, for example, an electronic apparatus for desktop or wall hanging use has been known as one of electronic apparatuses without the basees (Unexamined Japanese Patent Application Publication No. 2007-96878). The stand device of this electronic apparatus includes only a stand leg.

Only one setting angle is allowed to the apparatus body of this electronic apparatus by means of the stand leg. In other words, the stand leg is swingably connected to the apparatus body and is swung to be set in either a working position that determines the inclination angle, that is, the setting angle of the apparatus body or a retract position within the apparatus body. For this reason, if a need occurs to change the setting angle of the apparatus body according to status of use and the like, the electronic apparatus cannot satisfy such a demand.

When the stand leg is in the working position, the stand leg abuts against a swing restricting section of the apparatus body at its base thereof. The swing restricting section prevents the stand leg from swinging from the working position toward the retract position. To be more concrete, the stand leg is movable in a width direction of the apparatus body. By being moved in the width direction, the stand leg can abut against the swing restricting section at the working position.

On the other hand, since the stand leg is movable in the width direction of the apparatus body, if an external force is applied to the stand leg from the side, the stand leg moves in the width direction of the apparatus body and comes off of the swing restricting section. When this happens, the stand leg accidentally swings from the working position toward the retract position and fails to keep the apparatus body stably at its setting angle.

SUMMARY OF THE INVENTION

It is an object of the present invention to provide an electronic apparatus with a stand, which has a simple structure, offers a selection of setting angles of an apparatus body, and reliably maintains the apparatus body at the selected setting angle.

In order to achieve the above object, an electronic apparatus with a stand according to the invention comprises a box; a stand leg disposed in a back face side of the box, for allowing the box to be supported on a slant when the electronic apparatus is placed on a level surface; and a swinging device connecting the back face of the box and the stand leg to each other, for allowing the stand leg to swing in relation to the back face of the box. The swinging device has a locking mechanism that makes it possible to select an angle of the stand leg with respect to the back face of the box from a plurality of stages and locks the swinging of the stand leg at a selected stage.

The angle of the stand leg with respect to the back face of the box, which is swingably connected to the back face of the box with the swinging device, can be selected from the stages by using the locking mechanism. The stand leg can be locked at the selected stage.

Accordingly, the apparatus body can be reliably maintained at a selected setting angle.

In the electronic apparatus with a stand according to the invention, specifically, the swinging device includes a swing pivot that is equipped in either one of the box and the stand leg, and a receiving portion that is equipped in the other of the box and the stand leg and receives the swing pivot. The locking mechanism has a claw that is disposed in a distal end of the stand leg; a plurality of locking recesses that are formed in the back face of the box and can be engaged with the claw; and a guide groove that is formed in either one of the box and the stand leg which includes the receiving portion and is connected to the receiving portion, the guide groove that allows the swing pivot to make a relative movement with respect to the guide groove and prevents the swing pivot from moving when the claw is engaged with a selected locking recess.

As described above, with the electronic apparatus with a stand according to the invention, it is relatively easy to form the swinging device and the locking mechanism. It is then possible to improve the manufacturing efficiency of the electronic apparatus with a stand and to reduce the manufacturing costs.

In the electronic apparatus with a stand according to the invention, specifically, the guide groove includes a main groove portion that extends in a direction orthogonal to an axis of the swing pivot to allow the swing pivot to move in the orthogonal direction, the orthogonal direction coincides with a direction in which the locking claw is engaged with one of the locking recesses, and a sub groove portion that extends across the main groove portion and prevents the swing pivot from moving in the orthogonal direction when receiving the swing pivot.

When the swing pivot slides along the main groove portion of the guide groove, the stand leg moves toward the locking recesses, and then the locking claw of the stand is engaged with one of the locking recesses. In this state, if the swing pivot is inserted into the sub groove portion, the engagement between the locking claw and one of the locking recesses is firmly secured without difficulty. This lock is easily released by removing the swing pivot from the sub groove portion.

As described above, with the electronic apparatus with a stand according to the invention, the stand leg can be easily and firmly fixed at a given angle with a simple structure. The fixation of the stand leg is also released without difficulty. This facilitates an adjustment of the angle of the electronic apparatus when the electronic apparatus is placed on a level surface.

The electronic apparatus with a stand according to the invention therefore does not require other members, such as a base member, for keeping the angle of the stand leg. It is then possible not only to improve the manufacturing efficiency of the electronic apparatus and reduce the manufacturing costs but also to increase the freedom of the exterior design of the electronic apparatus.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirits and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Embodiments of an electronic apparatus with a stand according to the present invention will be described with reference to the attached drawings.

Figure 1:
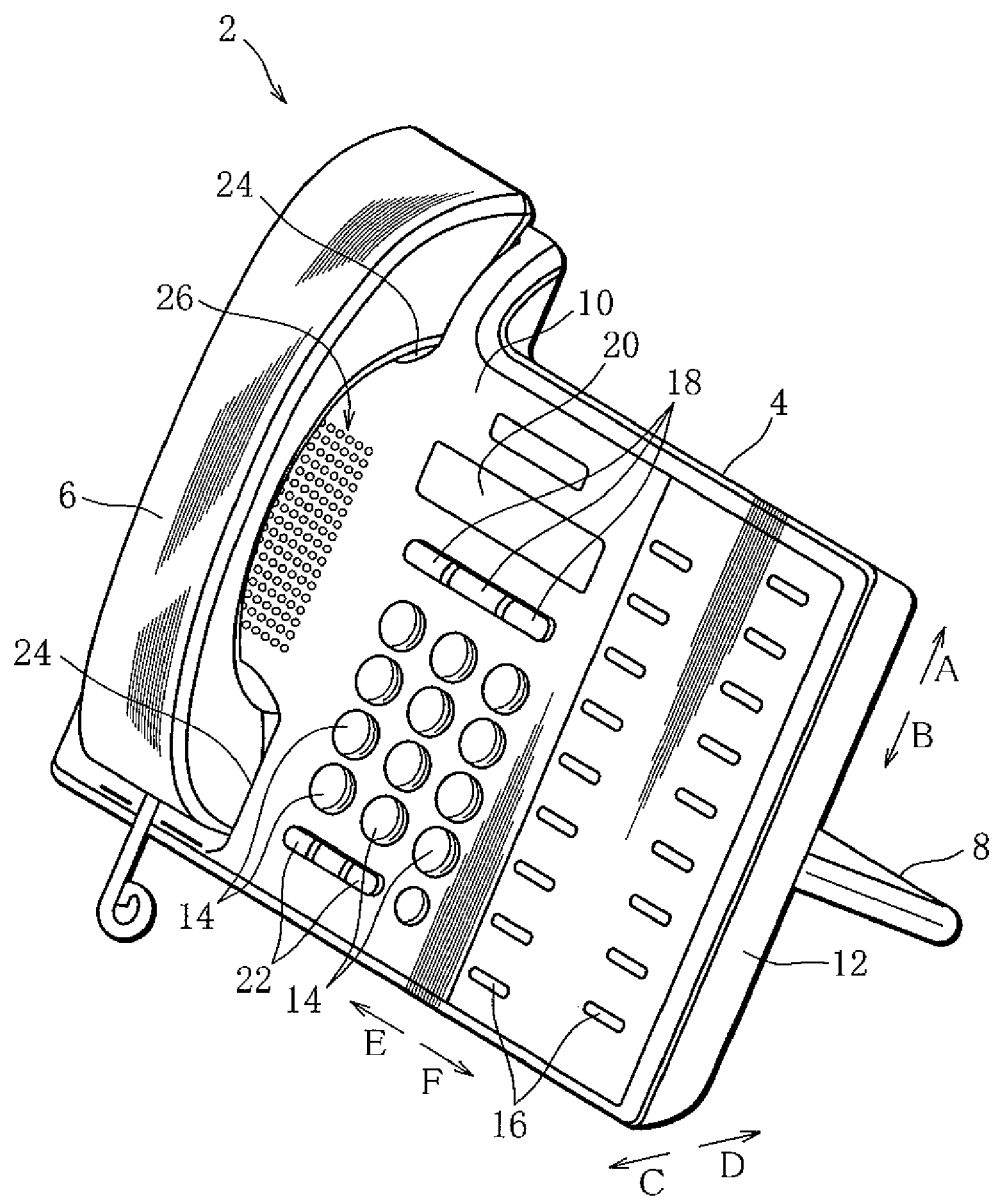
FIG. 1 is a perspective view of a telephone with a stand according to a first embodiment.

FIG. 1 shows a telephone 2 with a stand, which is a first embodiment of the electronic apparatus with a stand according to the invention.

The telephone 2 includes a box 4 serving as an apparatus body, a handset 6 rested on a left-hand portion of a front face of the box 4, and a stand leg 8 disposed in a back face of the box 4. The telephone 2 In FIG. 1, arrows A-F denote upper, lower, front, back, left and right directions of the telephone 2, respectively.

The box 4 is made of plastic material and includes a front panel 10 forming a front face of the box 4 and a rear case 12 forming a back face thereof. The box 4 contains components having telephonic function(not shown), other than the handset 6.

As is clear from FIG. 1, in the front face of the front panel 10, there are disposed dial keys 14, line buttons 16, function buttons 18, a liquid crystal display 20, speaker volume buttons 22, etc. A pair of upper and lower recesses 24 is formed in the left-hand side of the front panel 10. The recesses 24 form cradles for the handset 6. A large number of holes 26 are formed in between the two recesses 24. The holes 26 are distributed in a matrix. A speaker is accommodated in the box 4 to be located in a position that coincides with the distribution area of the holes 26.

Figure 2:
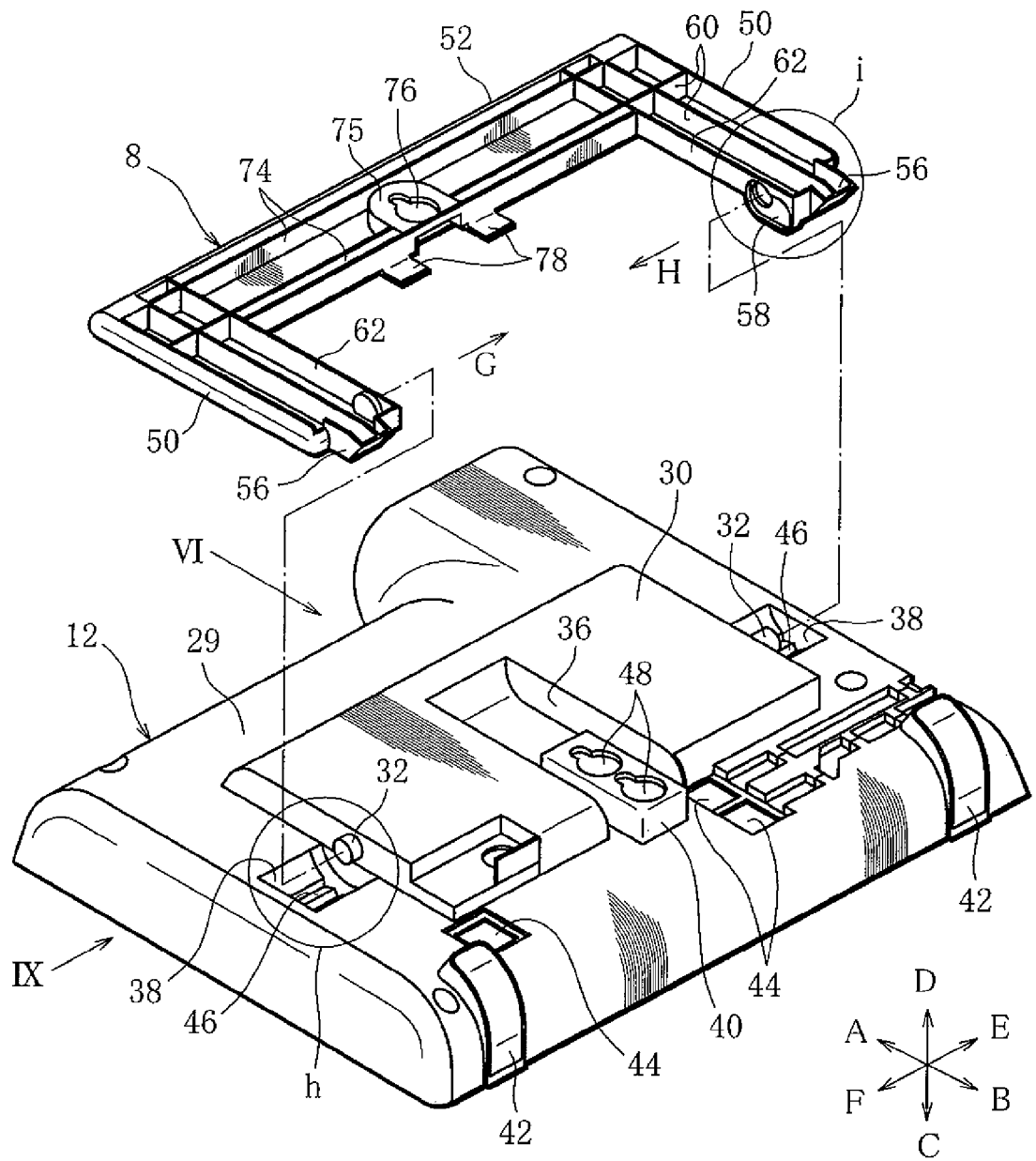
FIG. 2 is an exploded perspective view of a rear case according to the first embodiment.

The rear case 12 is formed into a flat container as illustrated in FIG. 2, and has a back wall 29 and a circumferential wall surrounding the back wall 29. Areas between the back wall 29 and the circumferential wall are formed into round corners. To be more specific, the round corner between upper and lower edges of the back wall 29 and upper and lower wall portions of the circumferential wall have a larger curvature radius than the round corner between right and left edges of the back wall 29 and right and left wall portions of the circumferential wall.

A substantially rectangular embossed portion 30 is disposed in the center of the back wall 29. The embossed portion 30 is long in a width direction of the backwall 29. The embossed portion 30 has a groove 36 in the middle thereof. The groove 36 extends in a vertical direction (A-B direction) of the back wall 29.

A rectangular or parallelepiped retainer block 40 is located in the groove 36. A part of the retainer block 40 is projected on the back wall 29 from the embossed portion 30. A back face of the retainer block 40 and that of the embossed portion 30, which are parallel to the back wall 29, are away from the back wall 29 at the same distance. That is to say, the back faces of the retainer block 40 and the embossed portion 30 are arranged in plane with each other. Two lower hook holes 48 are formed in the retainer block 40. The lower hook holes 48 are away from each other in the vertical direction (A-B direction) of the back wall 29. The lower hook holes 48 may be used to be engaged with a hook member(not shown) fixed on a wall.

Two rubber pads 42 are fitted on respective end portions of the lower round corner of the rear case 12. The rubber pads 42 each have a shape of an arc extending along the lower round corner.

Reference mark 44 in FIG. 2 represents insetting holes for modular-sockets.

Figure 3:
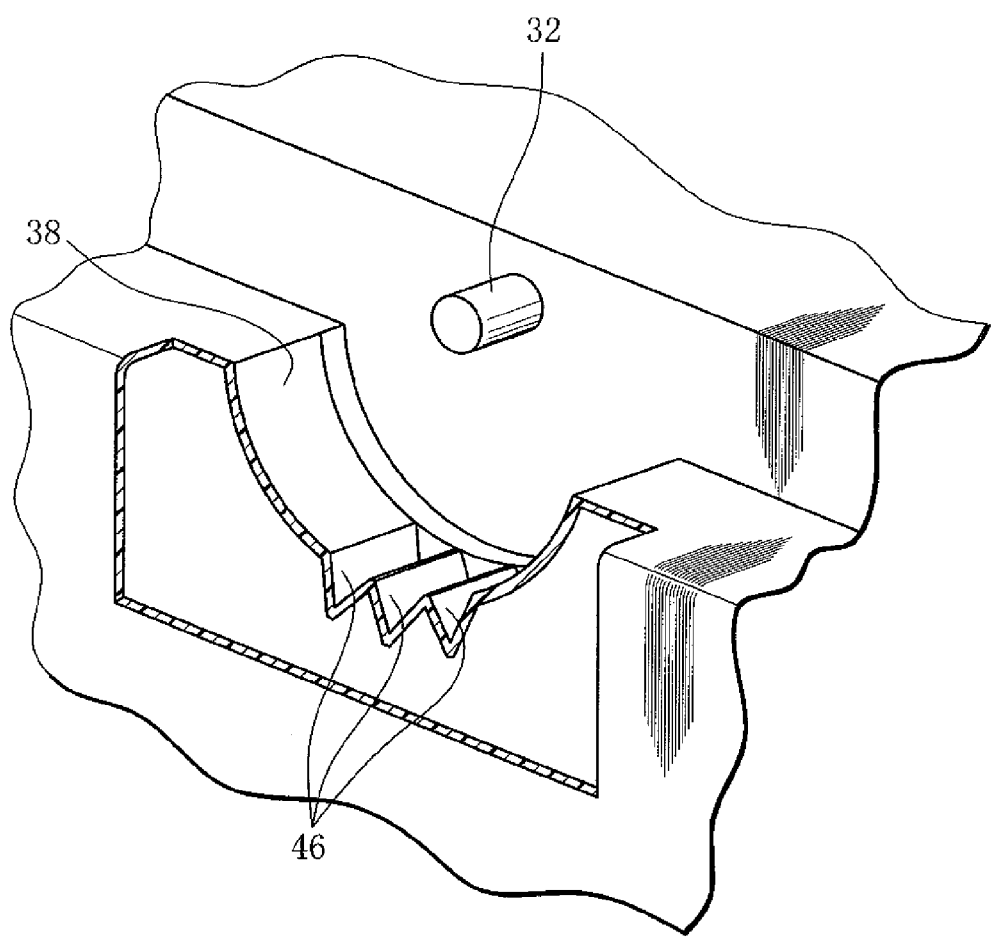
FIG. 3 is a perspective partially-cutaway view showing, in an enlarged scale, a part encircled by circle h in FIG. 2.

Two swing pivots 32 are projected from respective lateral faces of the embossed portion 30. Two recesses 38 are formed in the backwall 29 to be located near the respective swing pivots 32. The recesses 38 are basically positioned close to the respective lateral faces of the embossed portion 30. As is apparent from FIG. 3, each of the recesses 38 is in a shape of an arch with the corresponding swing pivot 32 located in the center thereof. Each of the recesses 38 has, for example, three locking grooves, namely three V-shaped grooves 46. The V-shaped grooves 46 extend along an axial direction of the swing pivots 32 and are radially arranged around the respective swing pivots 32. The telephone 2 is thus capable of adjusting the angle of the stand leg according to a selection of the V-shaped grooves 46 radially arranged around the swing pivots 32, thereby broadening the range of choice of an angle adjustment as described latter.

The stand leg 8 is made of plastic material as with the box 4, and has a substantially U-like shape that surrounds the embossed portion 30 on three sides as illustrated in FIG. 2. In short, the stand leg 8 has a pair of main legs 50 and an auxiliary leg 52 connecting proximal ends of the main legs 50. The main legs 50 and the auxiliary leg 52 are all in a plate-like shape, and have thickness that is equal to or slightly smaller than height of the embossed portion 30. FIG. 2 shows a back face of the stand leg 8.

The main legs 50 and the auxiliary leg 52 are substantially hollow, for the purpose of reducing the weight of the stand leg 8 as shown in FIG. 2. Ribs 60 and 74 are located in the legs 50 and 52. The ribs 60 and 74 compensate an insufficiency of strength of the stand leg 8, which is caused by the weight saving of the stand leg 8.

Each of the main legs 50 has a locking claw 56 in a distal end thereof. The locking claw 56 is protruding from the distal end of the corresponding main leg 50 in a longitudinal direction of thereof. The locking claw 56 has a triangular, or wedge-like, shape that can be engaged with one of the V-shaped grooves 46.

Distance between the distal ends of the main legs 50 is a little shorter than that between the proximal ends of the main legs 50. The main legs 50 are not parallel to each other and slightly inclined with respect toward an axis of the stand leg 8 in directions of arrows G and H in FIG. 2.

A guide groove 58 is formed in an inner lateral face 62 of each of the distal ends of the main legs 50. The guide grooves 58 are opposed to each other in a width direction of the stand leg 8. The details of the guide grooves 58 are specifically shown in FIG. 4. As is clear from FIG. 4, the guide groove 58 is in an L-like shape and has two ends. To be more concrete, the guide groove 58 has a main groove portion 64 that extends in a longitudinal direction of the main leg 50 and a sub groove portion 66 that is virtually orthogonal to the main groove portion 64. The sub groove 66 extends from an end of the main groove portion 64, which is located in the proximal end side of the main leg 50, toward the back face of the main leg 50. The main and sub groove portions 64 and 66 have a size capable of receiving the corresponding swing pivot 32, that is, width equal to or slightly larger than a diameter of the swing pivot 32.

Both the ends of the guide groove 58 are in an arc-like shape that can be in close contact with an outer circumference of the swing pivot 32. The sub groove portion 66 is formed into a circular recess deeper than the main groove portion 64 as is apparent from FIG. 5. The recess or the sub groove portion 66 overlaps into the main groove portion 64. A step between a bottom of the sub groove portion 66 and that of the main groove portion 64 is formed into an inclined face 63.

As illustrated in FIG. 2, the auxiliary leg 52 has a retainer block 75 in the middle of the back face thereof. In the retainer block 75, an upper hook hole 76 similar to the lower hook holes 48 is formed. Since the telephone 2 is provided with the upper hook hole 76 in the stand leg 8 as well, the freedom of the exterior design of the entire telephone 2 is secured.

The auxiliary leg 52 has a pair of locking tongues 78. The locking tongues 78 are protruding from an inner edge of the auxiliary leg 52, which is located in the main leg 50 side, toward the distal ends of the main legs 50. More specifically, the locking tongues 78 are arranged on both sides of the retainer block 75 and located in plane with the front face of the auxiliary leg 52.

Figure 6:
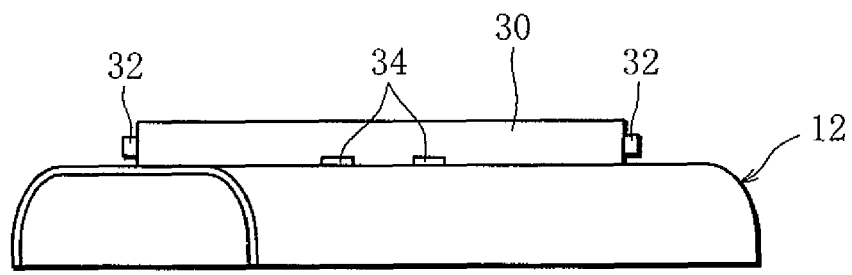
FIG. 6 is a view of the rear case viewed into a direction of arrow VI in FIG. 2.

The locking tongues 78 are insertable into the embossed portion 30. To this end, as illustrated in FIG. 6, a pair of insertion holes 34 that arrows the insertion of the locking tongues 78 is formed in an upper face of the embossed portion 30.

The stand leg 8 is connected to the back face of the rear case 12 in such a state that the embossed portion 30 of the rear case 12 is sandwiched between the main legs 50, and that the swing pivots 32 of the embossed portion 30 are received in the respective guide grooves 58 located in the distal ends of the main legs 50, as shown by chain dashed-dotted line in FIG. 2.

Figure 7:
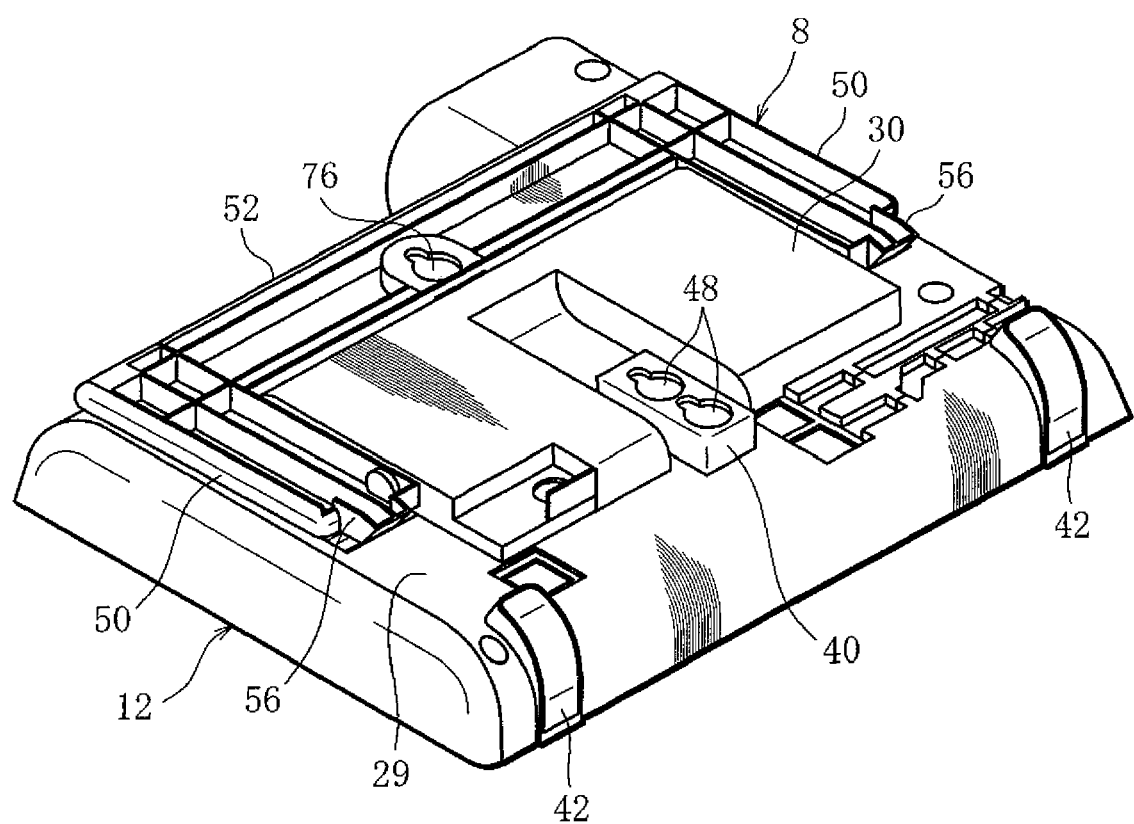
FIG. 7 is a perspective view of a configuration in which a stand leg of the rear case of the first embodiment is in a rest position.

FIG. 7 shows the stand leg 8 in a rest position.

While in the rest position, the stand leg 8 is superimposed upon the back face of the rear case 12 in an upside-down position and surrounds the embossed portion 30 of the rear case 12 on three sides thereof. The swing pivot 32 is set in a locking position within the corresponding guide groove 58.

Figure 8:
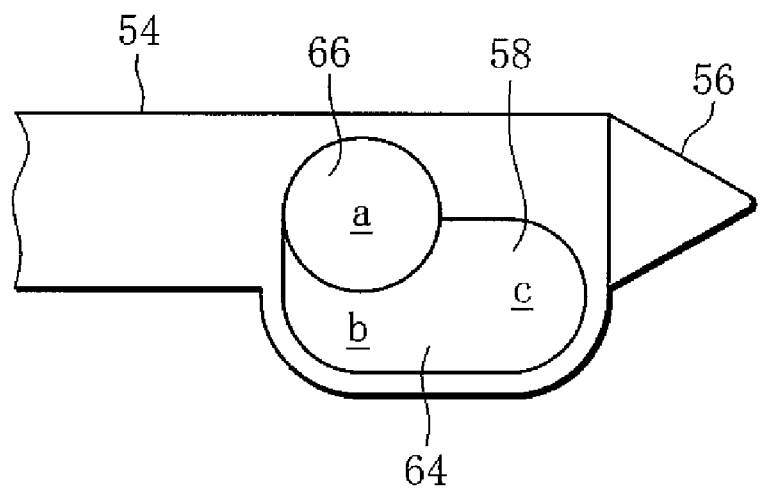
FIG. 8 is a lateral view showing a guide groove of the stand leg according to the first embodiment.

Relative positions of the swing pivots 32 within the guide grooves 58 will be explained, supposing that each of the guide grooves 58 are divided into three areas. As illustrated in FIG. 8, the area of sub groove portion 66, an areas of the main groove portion 64 which is located in the auxiliary leg 52 side, and an area of the main groove portion 64 which is located in the locking claw 56 side will be referred to as "a", "b" and "c", respectively. The swing pivot 32 in the locking position is located in the area "a" of the guide groove 58. Since the main legs 50 of the stand leg 8 are slightly inclined with respect to the axis of the stand leg 8 as mentioned above, the tip end of the swing pivot 32 is inserted in the sub groove portion 66 (the area "a") of the guide groove 58.

Distance between the swing pivot 32 and the V-shaped groove 46 and that between the guide groove 58 and the locking claw 56 will be mentioned below.

Figure 9:
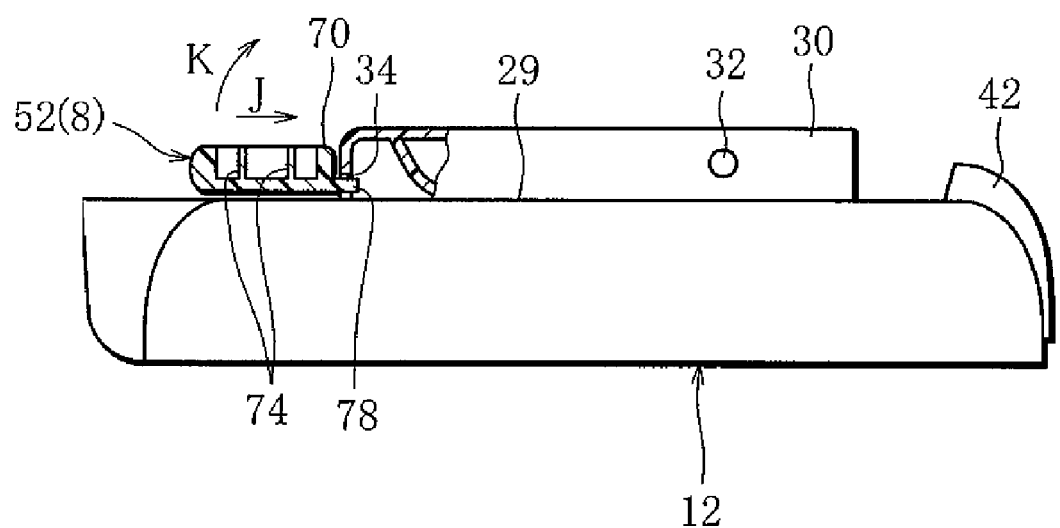
FIG. 9 is a view of the rear case viewed into a direction of arrow IX in FIG. 2.

While the stand leg 8 is in the rest position, the locking tongues 78 of the stand leg 8 are inserted in the insertion holes 34 of the embossed portion 30 in the rear case 12 from a direction of arrow J as illustrated in FIG. 9.

The stand leg 8 in the rest position is multiply locked with respect to the rear case 12. The stand leg 8 is specifically restricted from swinging in a rising direction (direction of arrow K in FIG. 9) by the locking tongues 78. As is obvious from FIGS. 10 and 11, since the swing pivot 32 (shown by a black circle for the sake of explanation) is located in the area "a" within the guide groove 58, the swing pivot 32 prevents the stand leg 8 from moving in such a direction that the locking tongues 78 are inserted or drawn out. The locking tongues 78 are then not pulled out of the insertion holes 34. The stand leg 8 is firmly connected to the back face of the rear case 12. The telephone 2 is sufficiently capable of being used for wall hanging in spite of the upper hook hole 76 in the stand leg 8. Consequently, according to the telephone of the invention, it is possible to provide a hook hole for wall hanging to the stand leg as well. This increases the freedom of the exterior design of the entire telephone.

Figure 4:
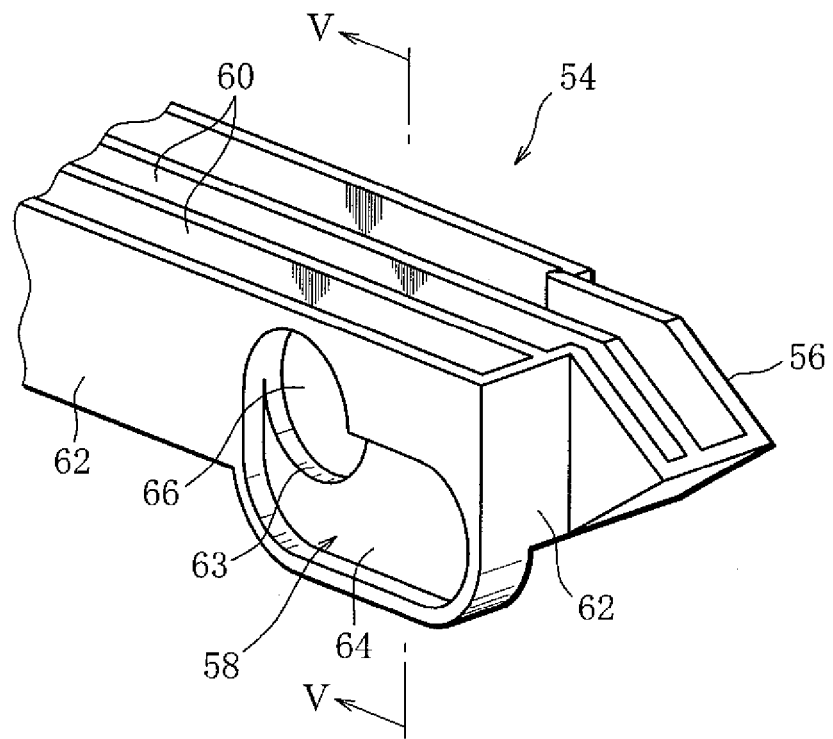
FIG. 4 is a perspective view showing, in an enlarged scale, a part encircled by circle i in FIG. 2.
Figure 5:
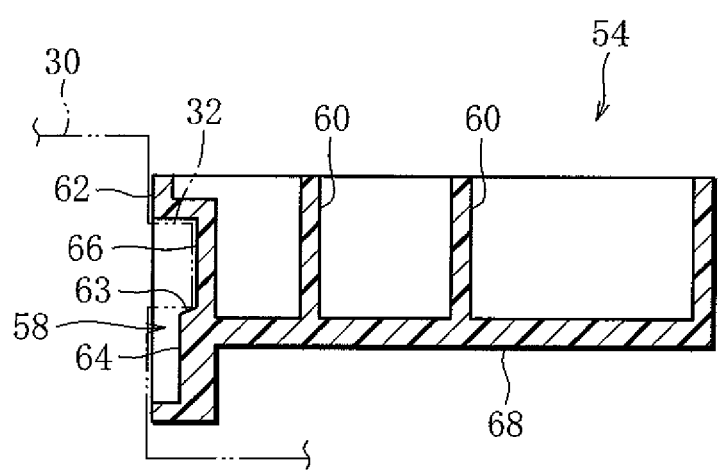
FIG. 5 is a sectional view, taken along line V-V in FIG. 4.

As is clear from FIGS. 4 and 5, the sub groove portion 66 of the guide groove 58, namely the area "a", is recessed further than other areas of the guide groove 58. In order to remove the swing pivot 32 from the area "a", it is required to elastically deform the distal ends of the main legs 50 of the stand leg 8 so that the distal ends are separated away from each other in a width direction of the rear case 12. By so doing, the stand leg 8 is firmly connected to the back face of the rear case 12, and never moves away from the back face of the rear case 12 under its own weight. The guide groove 58 includes the recess "a", which is capable of receiving the tip end of the swing pivot 32. When the tip end of the swing pivot is fitted into the recess "a" in the guide groove 58, the swing pivot 32 is prevented from being accidentally displaced from the locking position, thereby enabling a firmer lock.

While the stand leg 8 is in the rest position, the telephone 2 is used either on desktop or on wall, hanging on hook on an indoor wall by using the lower and upper hook holes 48 and 76 of the rear case 12.

The upper hook hole 76 is formed in the stand leg 8. However, the stand leg 8 in the rest position is firmly connected to, or fastened onto, the back face of the rear case 12, and the upper hook hole 76 of the stand leg 8 is never disengaged from the hook.

If the telephone 2 is used on desktop, the user can adjust the setting angle of the telephone 2 so that a liquid crystal display 20 is easily viewable. This adjustment is carried out by separating the stand leg 8 of the telephone 2 from the back face of the rear case 12 and setting the stand leg 8 at a desirable angle with respect to the back face of the rear case 12.

More concretely, the locked state described above is released by the following steps.

Figure 10:
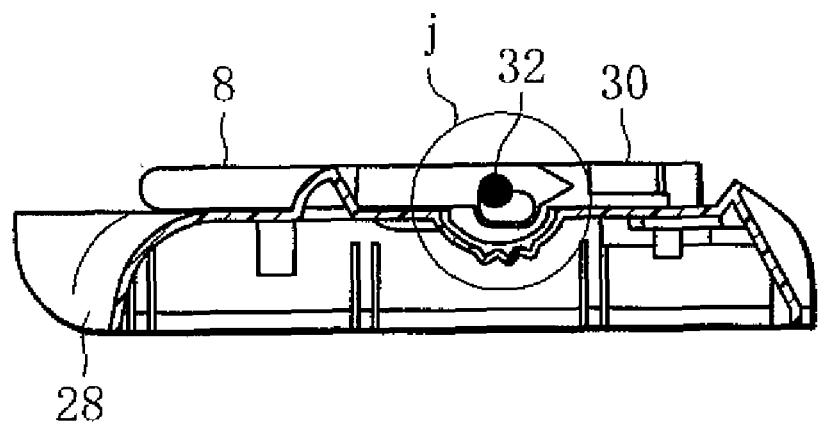
FIG. 10 is a lateral view, with the rear case partially cut away, showing a positional relation between the rear case and the stand leg when the stand leg of the first embodiment is in the rest position.
Figure 11:
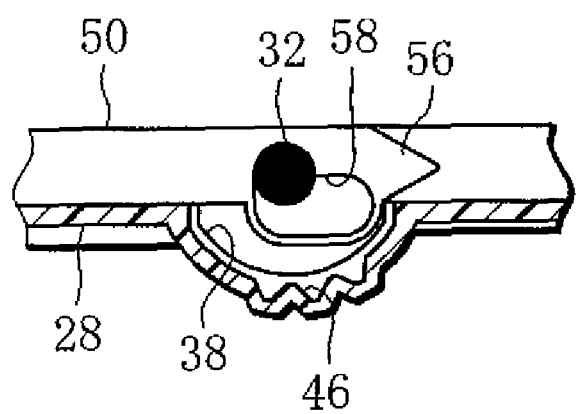
FIG. 11 is an enlarged view showing a part encircled by circle j in FIG. 10.
Figure 12:
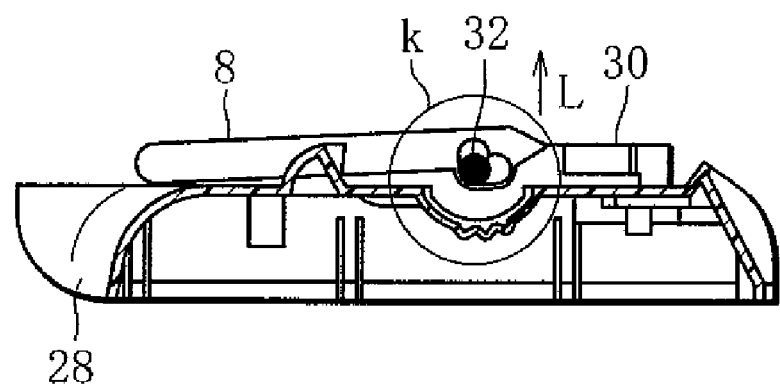
FIG. 12 is a lateral view, with the rear case partially cut away, showing the positional relation between the rear case and the stand leg when the lock in the first embodiment is released.
Figure 13:
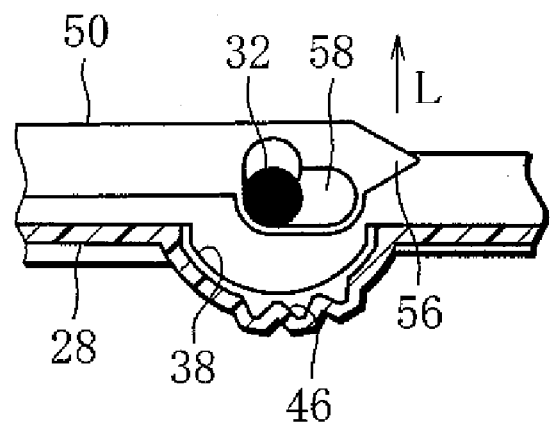
FIG. 13 is an enlarged view showing a part encircled by circle k in FIG. 12.

First, the stand leg 8 is raised from the rest position shown in FIGS. 10 and 11 in a direction of arrow L so that the distal ends of the main legs 50 are separated away from the back face of the rear case 12 as illustrated in FIGS. 12 and 13. Since the step between the sub groove portion 66 and the main groove portion 64 in the guide groove 58 is formed in the inclined face 63 (see FIG. 4), the tip end of the swing pivot 32 of the rear case 12 relatively presses the inclined face 63 of the guide groove 58. The main legs 50 is then displaced outwards as viewed in the width direction of the rear case 12 while being elastically deformed, thereby increasing distance between the distal ends of the main legs 50. The tip end of the swing pivot 32 is thus drawn out of the area "a" of the guide groove 58, namely the sub groove portion 66, and then relatively moves into the area "b" of the guide groove 58. At this point, the restriction on longitudinal movement of the main legs 50 of the stand leg 8 is released. The stand leg 8 is accordingly allowed to move in the longitudinal direction thereof.

Figure 14:
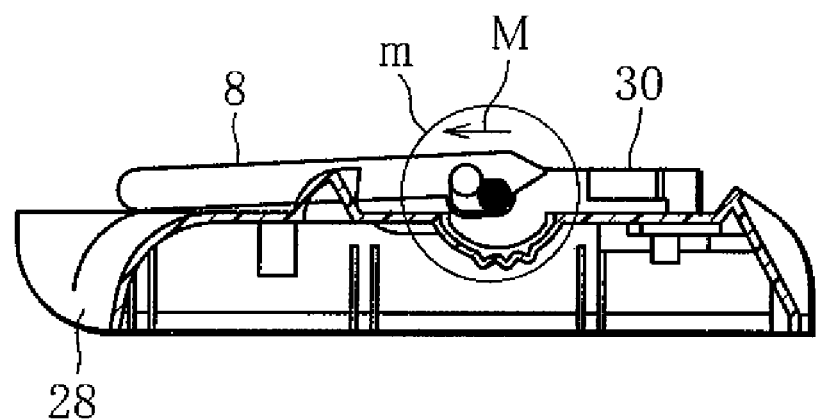
FIG. 14 is a lateral view, with the rear case partially cut away, showing the positional relation between the rear case and the stand leg when the lock in the first embodiment is released.
Figure 15:
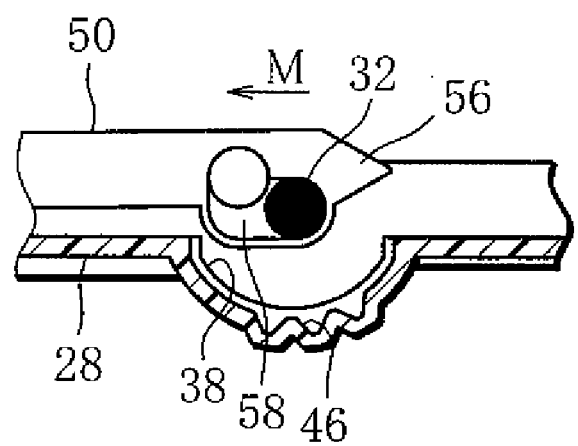
FIG. 15 is an enlarged view showing a part encircled by circle m in FIG. 14.
Figure 16:
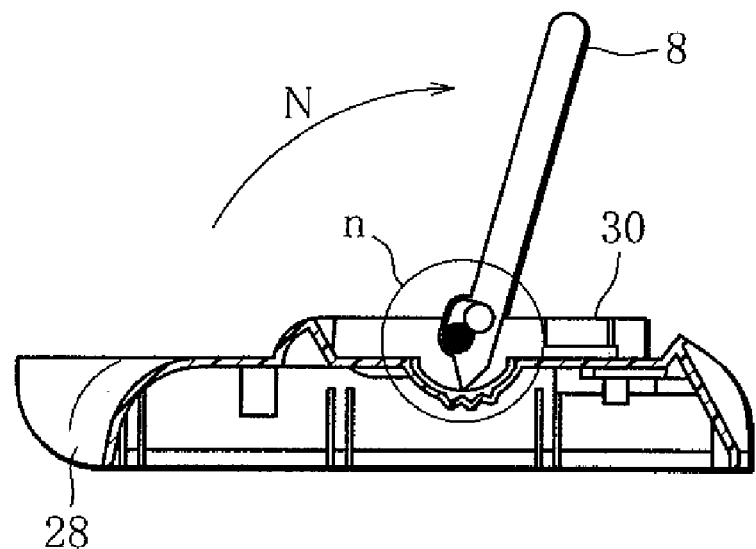
FIG. 16 is a lateral view, with the rear case partially cut away, showing the positional relation between the rear case and the stand leg when the stand leg of the first embodiment swings.
Figure 17:
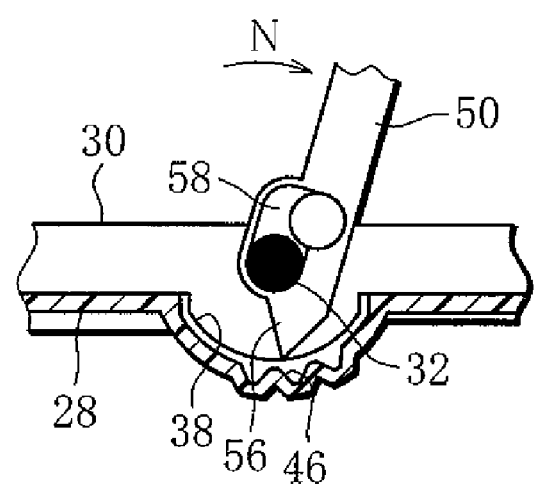
FIG. 17 is an enlarged view showing a part encircled by circle n in FIG. 16.

The stand leg 8 is subsequently moved in a direction of arrow M as illustrated in FIGS. 14 and 15. This makes the swing pivot 32 relatively move from the area "b" to the area "c" within the guide groove 58. As the same time when the locking tongues 78 are drawn out of the insertion holes 34 of the rear case 12, the distal ends of the main legs 50, namely the locking claws 56, are positioned in the region corresponding to the recesses 38 of the rear case 12. The stand leg 8 is then allowed to swing around the swing pivot 32. The user accordingly can swing the stand leg 8 as illustrated in FIGS. 16 and 17.

Figure 18:
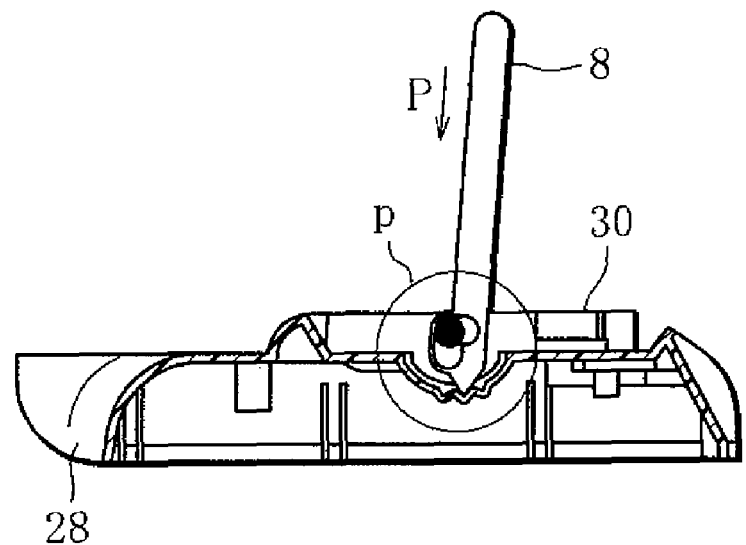
FIG. 18 is a lateral view, with the rear case partially cut away, showing the positional relation between the rear case and the stand leg when the stand leg of the first embodiment is locked.
Figure 19:
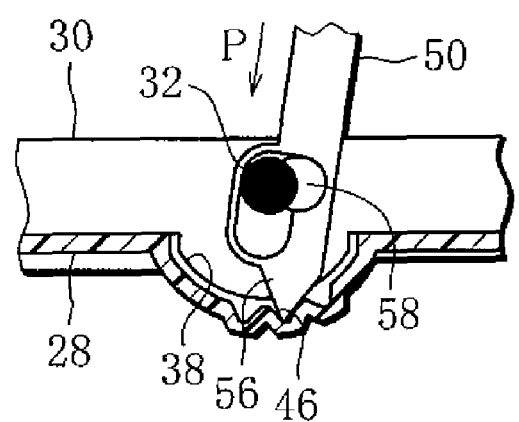
FIG. 19 is an enlarged view showing a part encircled by circle p in FIG. 18.

As a result of the swinging of the stand leg 8, the tip edges of the locking claws 56 face selected V-shaped grooves 46 of the recesses 38, respectively, the stand leg 8 is pushed in a direction of arrow P as illustrated in FIGS. 18 and 19. The locking claws 56 of the stand leg 8 are engaged with the respective selected V-shaped grooves 46. At the same time, the swing pivots 32 relatively move from the areas "c" to the areas "b" within the guide grooves 58.

Figure 20:
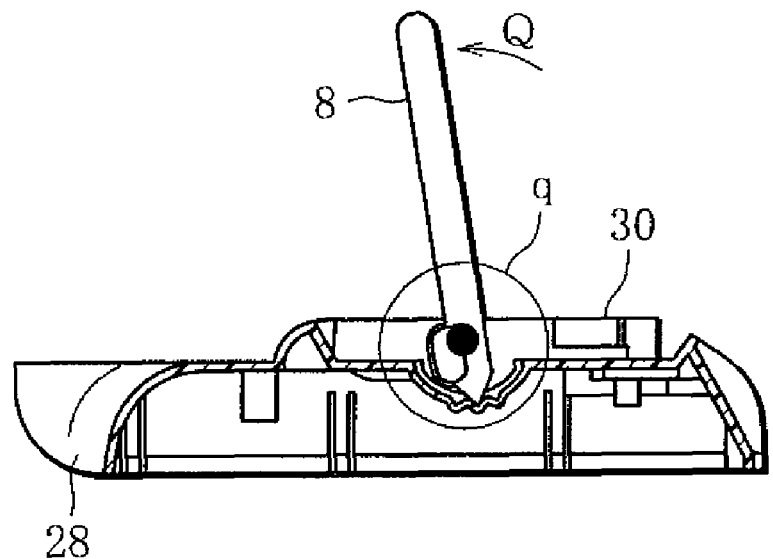
FIG. 20 is a lateral view, with the rear case partially cut away, showing the positional relation between the rear case and the stand leg when the stand leg of the first embodiment is locked.
Figure 21:
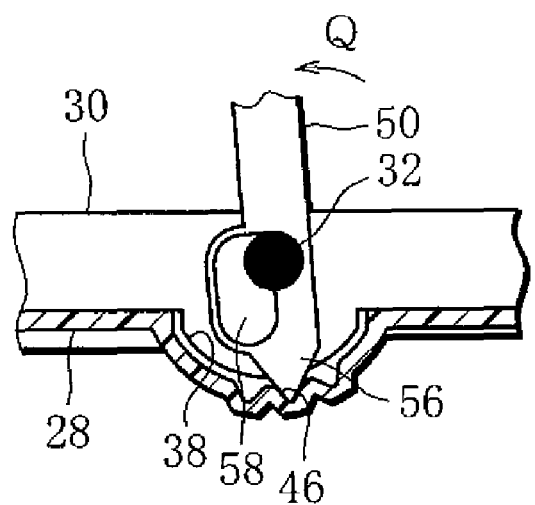
FIG. 21 is an enlarged view showing a part encircled by circle q in FIG. 20.

As illustrated in FIGS. 20 and 21, when the stand leg 8 is swung in a direction of arrow Q while using as fulcrums the selected V-shaped grooves 46, with which the locking claws 56 are engaged, the swing pivots 32 relatively move from the areas "b" to the areas "a" within the guide grooves 58. Since the swing pivots 32 restrict the stand leg 8 from moving in the longitudinal direction of the main legs 50, the locking claws 56 are locked in a position engaged with the selected V-shaped grooves 46. The stand leg 8 is maintained, or locked, in such a working position as to be set at an angle determined by the selected V-shaped groove 46 with respect to the back face of the rear case 12.

Since the area "a" of the guide groove 58, namely the sub groove portion 66, is recessed further than the other areas of the guide groove 58, when the swing pivot 32 relatively moves into the sub groove portion 66, the guide groove 58 is displaced toward the swing pivot 32 because of a restoring force of the main legs 50. As a result, the tip end of the swing pivot 32 is brought into a state relatively and securely falling into the sub groove portion 66, that is, a locked state. The stand leg 8 is thus multiply locked in the working position as well, and the locking claws 56 and the selected V-shaped grooves 46 are firmly engaged with each other.

Figure 22:
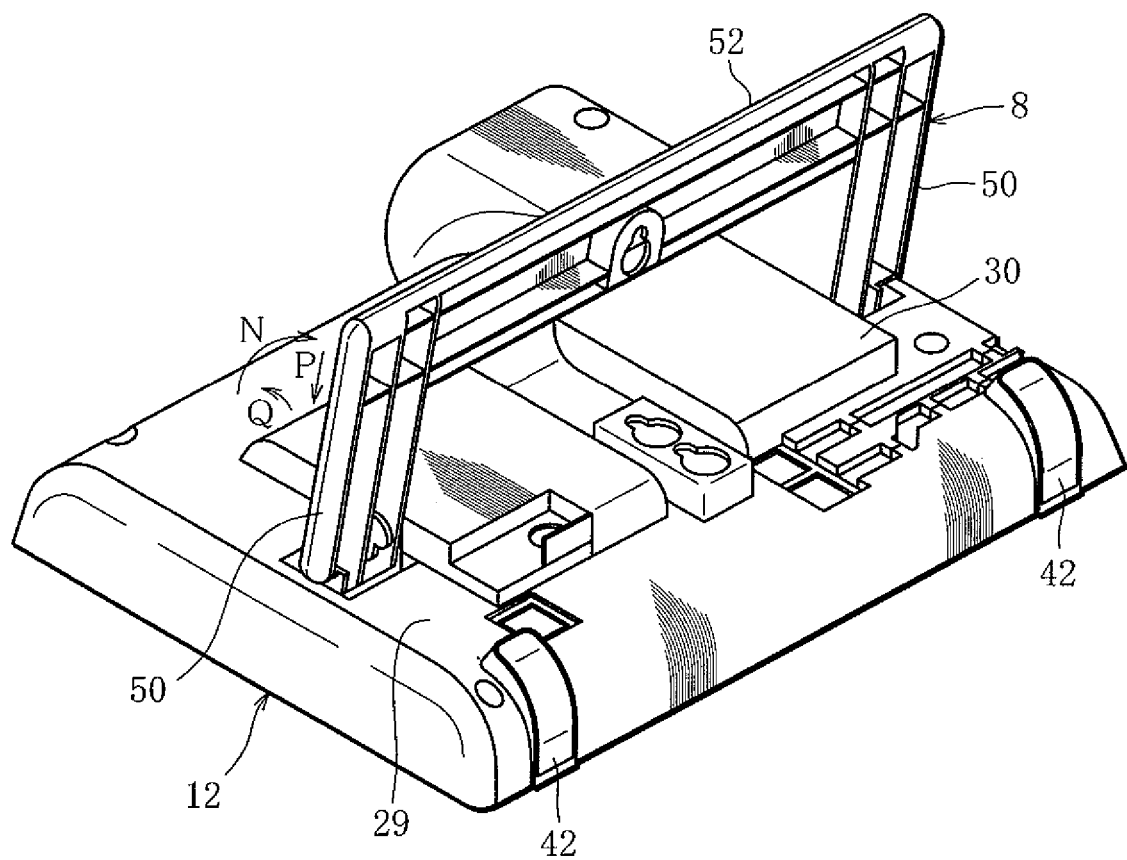
FIG. 22 is a perspective view of the rear case in a state where the stand leg of the first embodiment is in a standup position.

When moved to and locked in the working position, the stand leg 8 comes into a position raised from the back face of the rear case 12 as illustrated in FIG. 22. In this state, the telephone 2 is placed on desktop at a setting angle determined by the stand leg 8 as illustrated in FIG. 1.

In order to set the stand leg 8 in another working position or back to the rest position to change the setting angle of the telephone 2, the lock of the stand leg 8 is released in a reverse procedure to the foregoing procedure. The stand leg 8 is thus locked again in another working position or the rest position.

A telephone with a stand according to a second embodiment of the invention will be described below with reference to the attached drawings.

The telephone of the second embodiment is different from the telephone 2 of the first embodiment in terms of the rear case and the rest position of the stand leg. Apart from these differences, the telephone of the second embodiment is the same as the telephone 2 of the first embodiment. In the following description of the telephone of the second embodiment, only the differences from the first embodiment will be explained.

Figure 23:
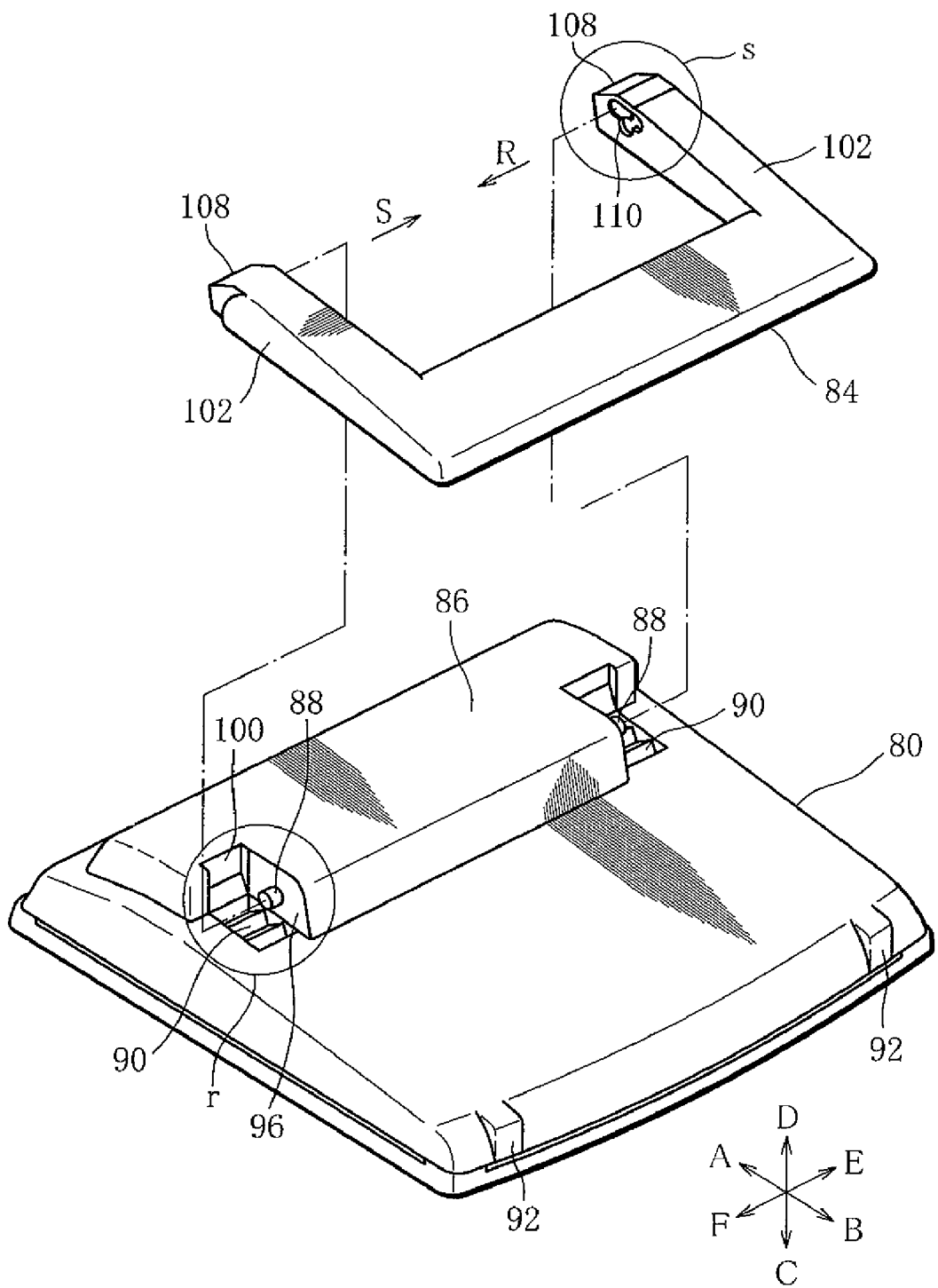
FIG. 23 is an exploded perspective view of a rear case according to a second embodiment.

FIG. 23 shows a rear case 80 according to the second embodiment.

The rear case 80 has an embossed portion 86 that is disposed in an upper portion of the rear case 80 (arrow A direction side). The embossed portion 86 is provided with cut-away portions in lower portions of both lateral faces thereof. Each of the cut-away portions includes a lateral wall 96 and an end wall 100. Two swing pivots 88 are disposed in the respective lateral walls 96 of the cut-away portions. Recesses 90 are arranged adjacently to the respective swing pivots 88. The swing pivots 88 and the recesses 90 correspond to the swing pivots 32 and the recesses 38, respectively, of the first embodiment. As is obvious from FIG. 23, a pair of rubber pads 92 is attached to a lower portion of the rear case 80. The rubber pads 92 correspond to the rubber pads 42 of the first embodiment.

Figure 24:
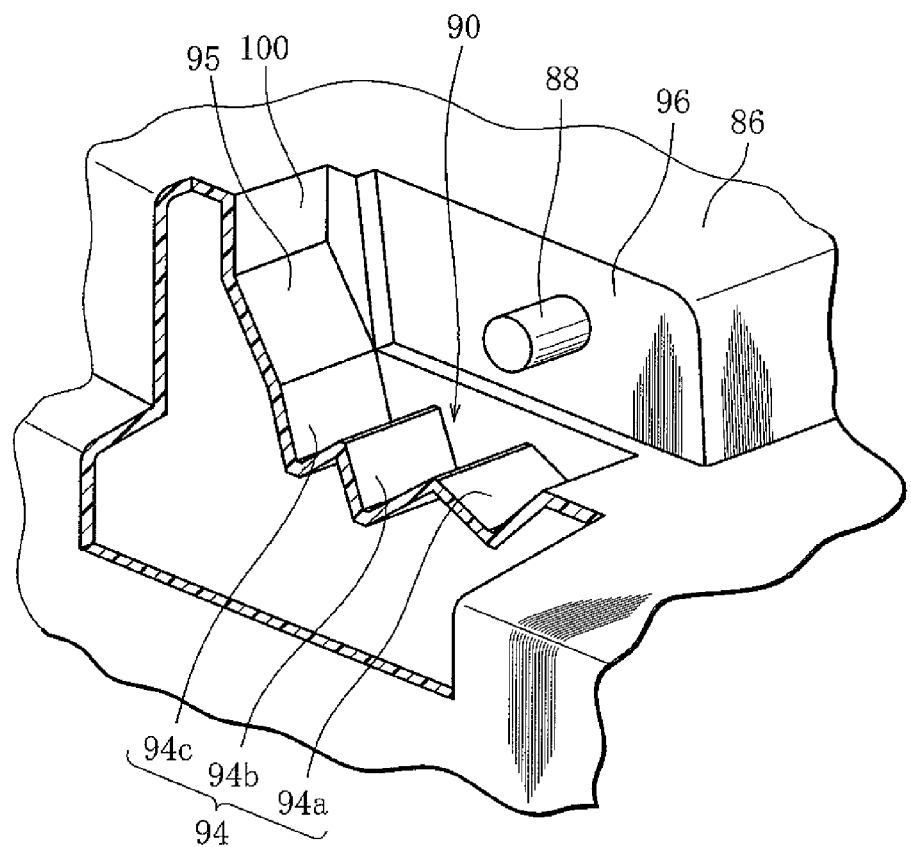
FIG. 24 is a perspective partially-cutaway view showing, in an enlarged scale, a part encircled by circle r in FIG. 23.

As illustrated in FIG. 24, each of the recesses 90 includes for example, three V-shaped grooves 94. More specifically, the V-shaped grooves 94 include V-shaped grooves 94a, 94b and 94c that define their respective working positions of the stand leg 84. The end wall 100 includes an inclined face 95.

The stand leg 84 has locking claws 108 in distal ends of two main legs 102 as illustrated in FIG. 23. Each of the locking claws 108 may be engaged with one of the V-shaped grooves 94.

Figure 25:
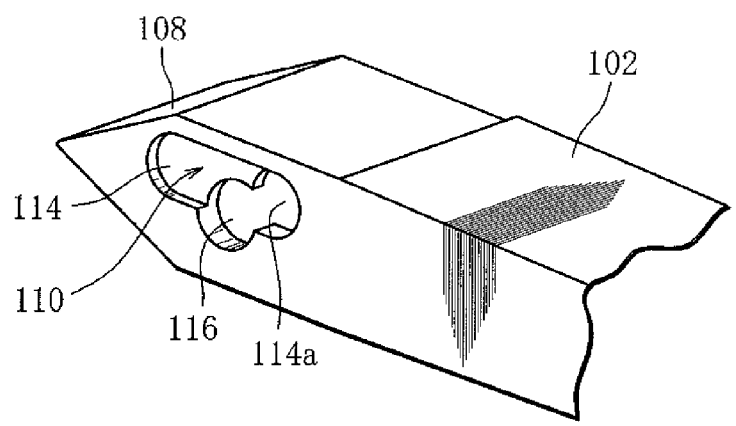
FIG. 25 is a perspective view showing, in an enlarged scale, a part encircled by circle s in FIG. 23.

As is apparent from FIG. 25, a guide groove 110 of the main leg 102, which cooperates with the swing pivot 88, is I-shaped. To be more concrete, the guide groove 110 has a main groove portion 114 that extends in a longitudinal direction of the main leg 102 and a sub groove portion 116 that is orthogonal to the main groove portion 114 at a substantially middle point of the main groove portion 114. The sub groove portion 116 corresponds to the sub groove portion 66 of the first embodiment. As is clear from FIG. 25, one end of the main groove portion 114, that is, an end 114a located farther from the locking claw 108, is recessed further than a bottom of the main groove portion 114 as with the sub groove portion 116.

The stand leg 84 is swingably connected to the rear case 80 by receiving the swing pivot 88 of the rear case 80 in the respective guide grooves 110 as shown by a chain dashed-dotted line in FIG. 23. As in the first embodiment, the distal ends of the main legs 102 are a little inclined in directions of arrows S and R in FIG. 23 with respect to an axis of the stand leg 84.

Figure 26:
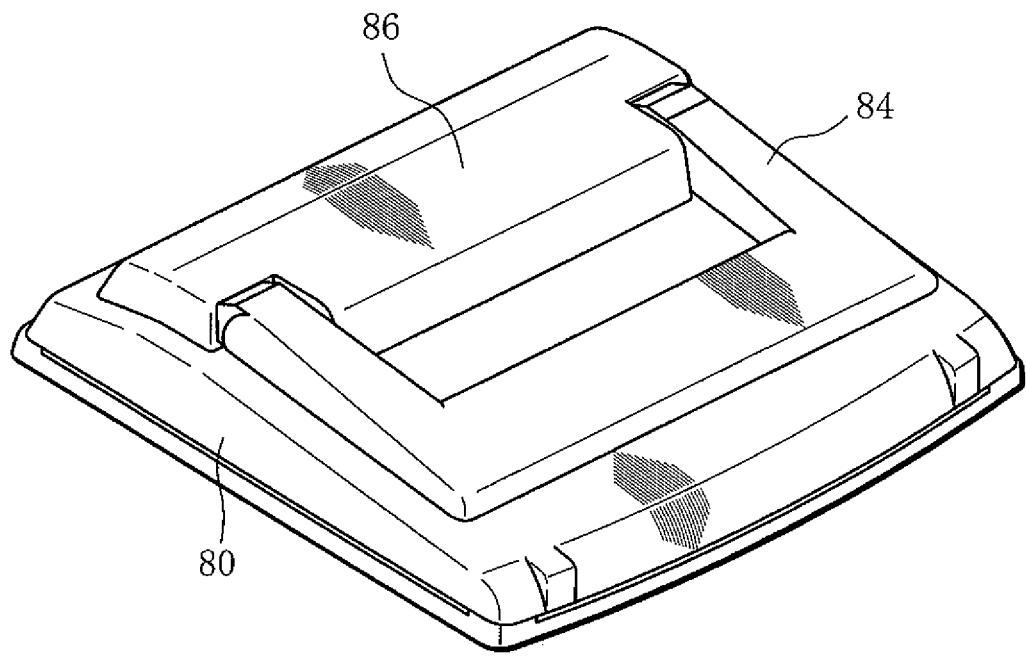
FIG. 26 is a perspective view showing a state in which the stand leg of the rear case of the second embodiment is in the rest position.

FIG. 26 shows the stand leg 84 in a rest position. In this state, the stand leg 84 is superposed upon a back face of the rear case 80, only it is in a reversed position to the stand leg 8 that is in the rest position in the first embodiment. An auxiliary leg of the stand leg 84 is located in a lower end portion of the rear case 80.

Again, relative positions of the swing pivots 88 within the guide grooves 110 will be explained, supposing that each of the guide grooves 110 are divided into four areas.

Figure 27:
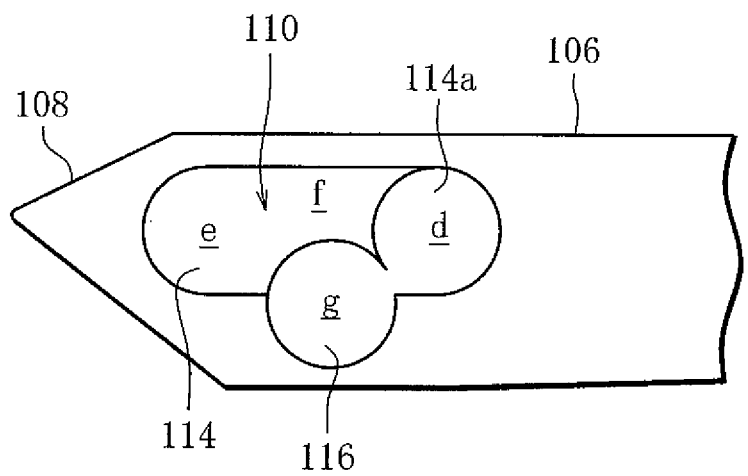
FIG. 27 is a lateral view showing a guide groove of the stand leg according to the second embodiment.

As illustrated in FIG. 27, the end 114a of the main groove portion 114 and the end of the main groove portion 114 which is in the locking claw 108 side are referred to as areas "d" and "e", respectively. An area between the areas "d" and "e" in the main groove portion 114 is referred to as "f", and the sub groove portion 116 as "g".

Figure 28:
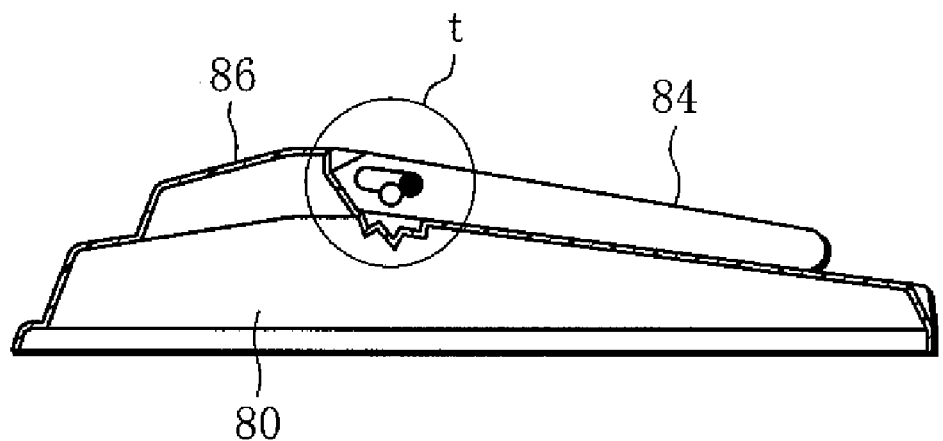
FIG. 28 is a lateral view, with the rear case partially cut away, showing a positional relation between the rear case and the stand leg when the stand leg of the second embodiment is in the rest position.
Figure 29:
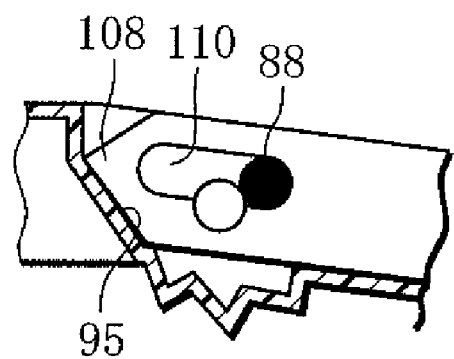
FIG. 29 is an enlarged view showing a part encircled by circle t in FIG. 28.

When the stand leg 84 is in the rest position, the swing pivot 88 (shown by a black circle for the sake of explanation) is positioned in the area "d" of the guide groove 110, and the locking claw 108 is in contact with the inclined face 95 of the end wall 100 as illustrated in FIGS. 28 and 29. The inclined face 95 restricts the stand leg 84 from swinging around the swing pivot 88. At this point, the tip end of the swing pivot 88 overlaps into the area "d" of the guide groove 110, or the end 114a. The locking claws 108 of the stand leg 84 are effectively prevented from moving away from the inclined face 95. The engagement between the locking claws 108 and the inclined faces 95 is reliably maintained, which prevents an undesirable movement of the stand leg 84. The stand leg 84 is then multiply locked in the rest position, and the locked position is stably maintained.

Figure 30:
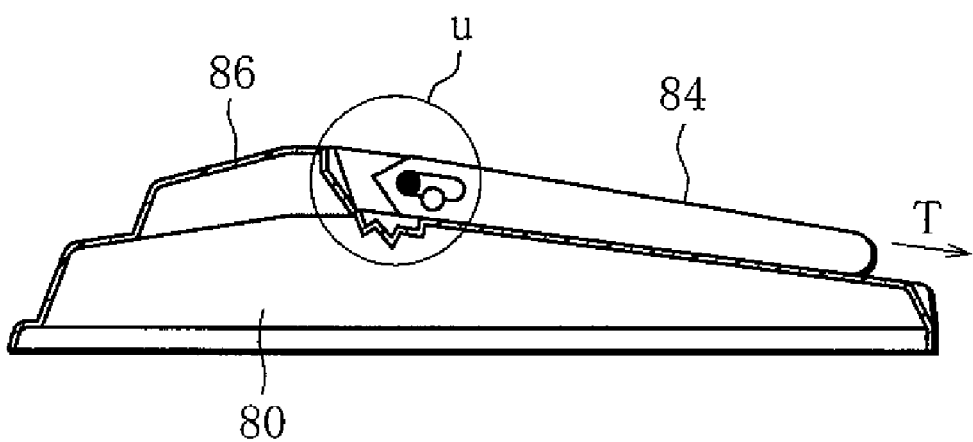
FIG. 30 is a lateral view, with the rear case partially cut away, showing the positional relation between the rear case and the stand leg when the lock in the second embodiment is released.
Figure 31:
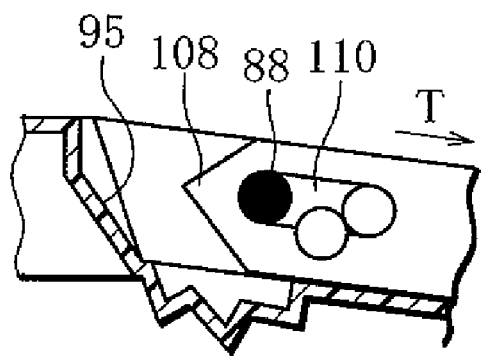
FIG. 31 is an enlarged view showing a part encircled by circle u in FIG. 30.

When the stand leg 84 is set from the rest position to the working position, first of all, the stand leg 84 is displaced in a direction of arrow T as illustrated in FIGS. 30 and 31. The displacement elastically deforms the main legs of the stand leg 84 so as to increase distance between the distal ends of the main legs as in the first embodiment. The tip end of the swing pivot 88 is thus relatively pulled out of the area "d" of the guide groove 110, or the end 114a.

When the stand leg 84 is further displaced in the T direction, the swing pivots 88 relatively move from the areas "d" to the areas "e" of the guide grooves 110. At the same time, the locking claws 108 of the stand leg 84 move away from the inclined faces 95. At this point, the locking claws 108 do not interfere with any of the V-shaped grooves 94, and the stand leg 84 becomes swingable around the swing pivots 88.

Figure 32:
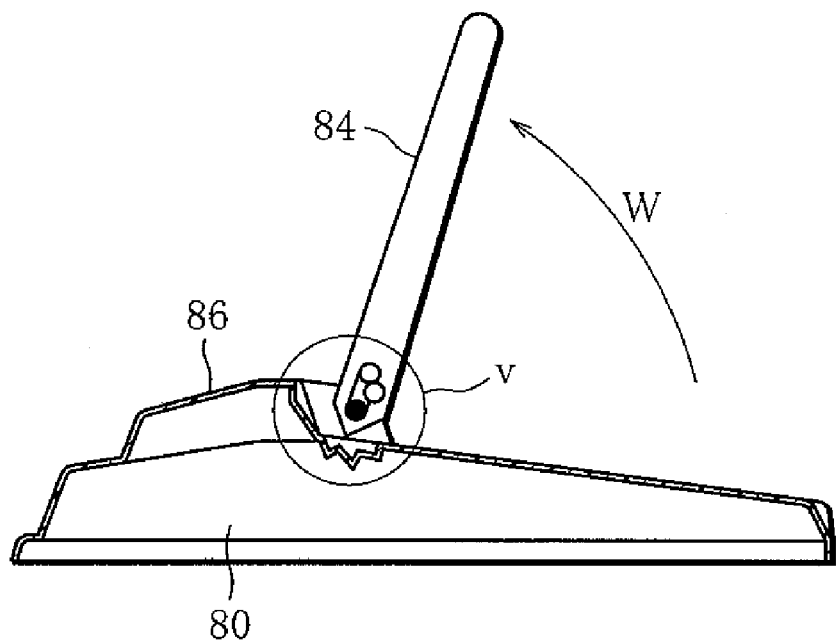
FIG. 32 is a lateral view, with the rear case partially cut away, showing the positional relation between the rear case and the stand leg when the stand leg of the second embodiment swings.
Figure 33:
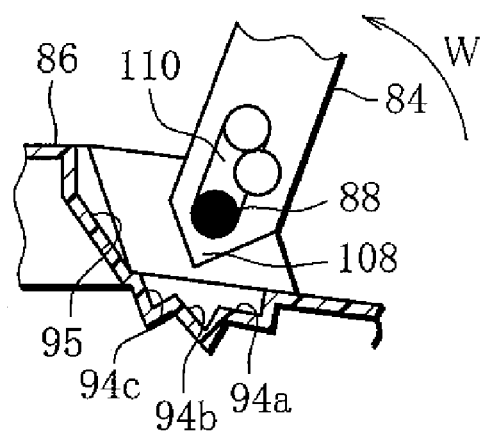
FIG. 33 is an enlarged view showing a part encircled by circle v in FIG. 32.
Figure 34:
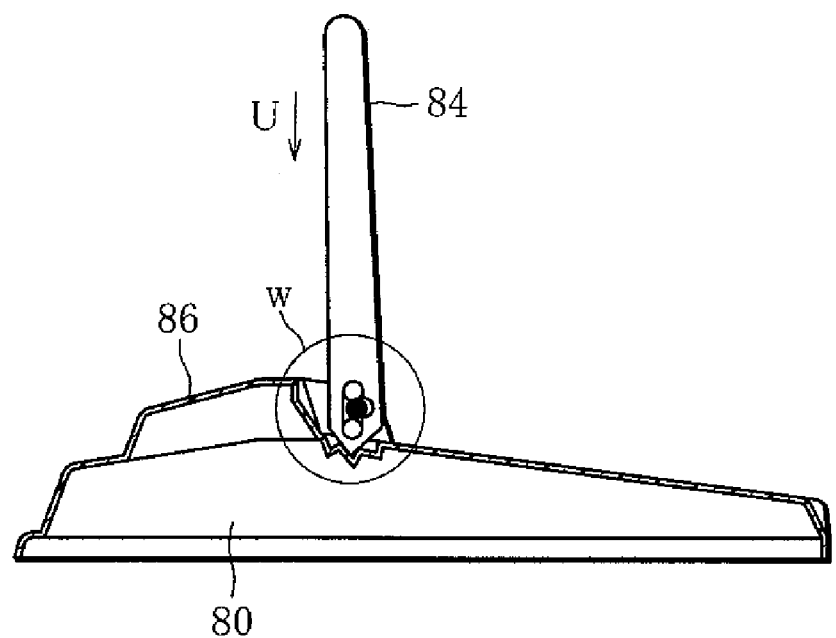
FIG. 34 is a lateral view, with the rear case partially cut away, showing the positional relation between the rear case and the stand leg when the stand leg in the second embodiment is locked.
Figure 35:
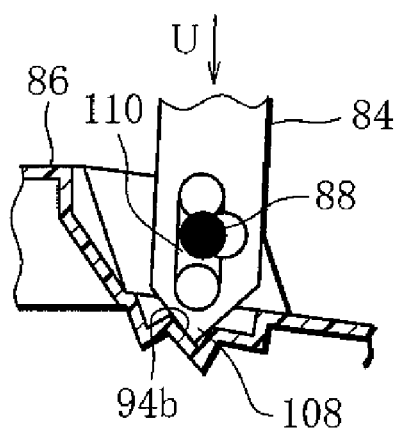
FIG. 35 is an enlarged view showing a part encircled by circle w in FIG. 34.

As illustrated in FIGS. 32 and 33, the stand leg 84 is swung around the swing pivots 88 (in a direction of arrow W). Each of the tip edges of the locking claws 108 of the stand leg 84 faces a selected one among the V-shaped grooves 94a, 94b and 94c. In this state, when the stand leg 84 is displaced in a direction of arrow U as illustrated in FIGS. 34 and 35, the swing pivots 88 relatively move from the areas "e" to the areas "f" within the guide grooves 110. The locking claws 108 are simultaneously received, for example, in the selected V-shaped grooves 94b. The locking claws 108 and the respective V-shaped grooves 94b are engaged with each other.

Figure 36:
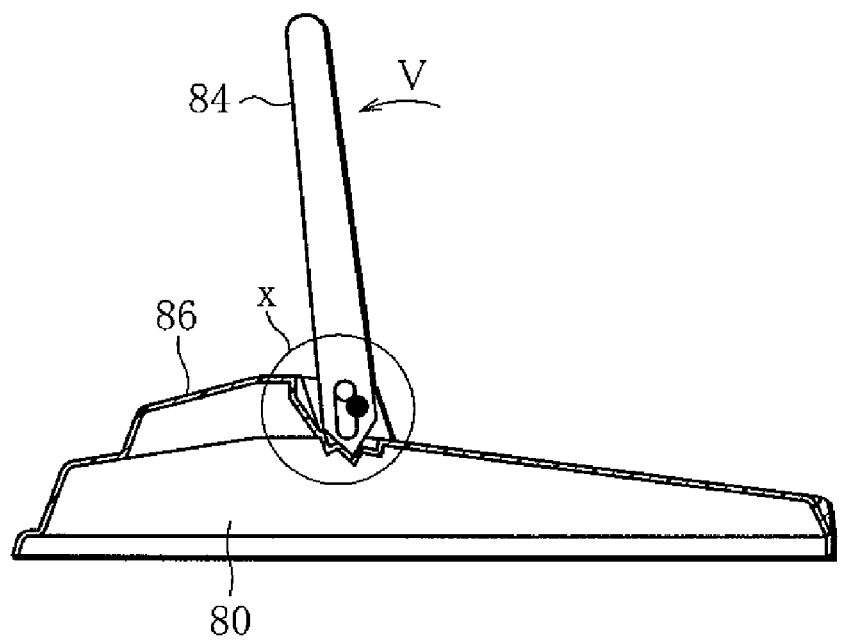
FIG. 36 is a lateral view, with the rear case partially cut away, showing the positional relation between the rear case and the stand leg when the stand leg in the second embodiment is locked.
Figure 37:
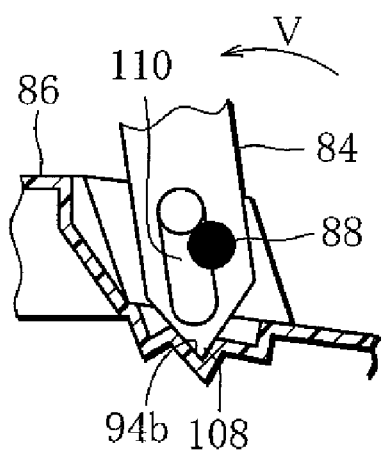
FIG. 37 is an enlarged view showing a part encircled by circle x in FIG. 36.
Figure 38:
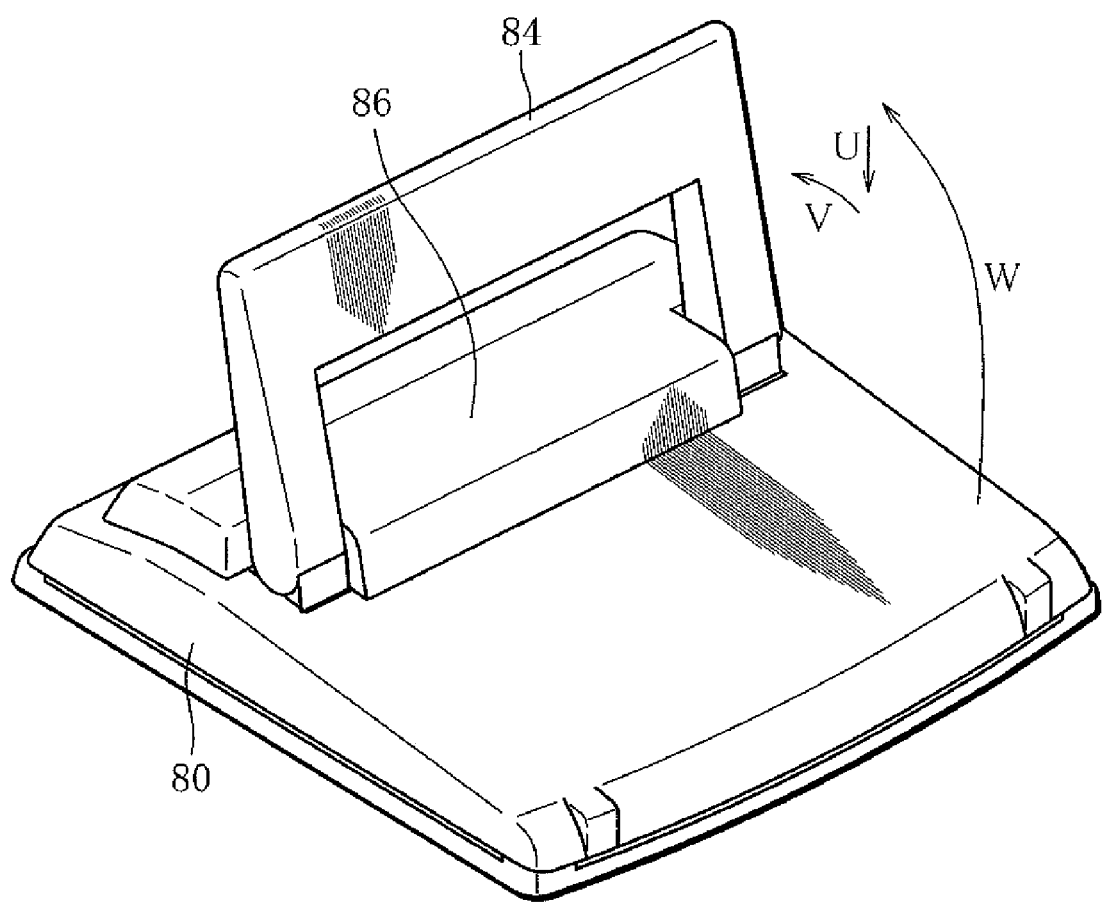
FIG. 38 is a perspective view showing a state in which the stand leg of the rear case of the second embodiment is in a standup position.

When the stand leg 84 is swung in a direction of arrow V by using the V-shaped grooves 94b, with which the locking claws 108 are engaged, as a fulcrum as illustrated in FIGS. 36 and 37, the stand leg 84 is positioned in the working position. In this process, the swing pivots 88 relatively move from the areas "f" to the areas "g" within the guide grooves 110. This restricts the stand leg 84 from moving in a longitudinal direction of the main legs 102. The stand leg 84 is thus set and locked in the working position as illustrated in FIG. 38 in a state where the locking claws 108 are engaged with the V-shaped grooves 94b. An angle of the stand leg 84 in this situation is determined by the V-shaped grooves 94b.

Since the area "g" of the guide groove 110, namely the sub groove portion 116, is recessed, when the swing pivot 88 is set in the sub groove portion 116, the tip end of the swing pivot 88 overlaps into the sub groove portion 116 because of a restoring force of the main legs 102 of the stand leg 84. The stand leg 84 is then multiply locked even in the working position, and the locked position is stably maintained.

To arrange the stand leg 84 in another working position or the rest position, the lock is released in a reverse procedure to the foregoing procedure. The stand leg 84 is then locked in another working position or the rest position.

As stated above, the guide groove of the telephone of the invention may have a simple shape, such as L- and T-like shapes. This facilitates the manufacture of the telephone, and improves the manufacturing efficiency of the telephone as a whole.

The invention is not limited to the embodiments and may be modified in various ways.

For example, in the first and second embodiments, the swing pivots are disposed in the embossed portion of the rear case, and the guide groove that cooperate with the swing pivots are formed in the stand leg. However, the swing pivots may be disposed in the stand leg, and the guide grooves may be formed in the embossed portion. The shape of the stand leg is not limited to the U-like shape that surrounds the embossed portion on three sides.

Furthermore, the electronic apparatus with a stand according to the invention is not limited to the telephones described in the embodiments. The invention may be applied to other electronic apparatuses, such as flat-screen televisions and low-profile displays, which are used on desktop by using the stand leg or used on wall hanging.

What is claimed is:

1. An electronic apparatus with a stand, comprising:
   a box;
   a stand leg disposed in a back face side of said box, said stand leg allowing support of said box on a slant when the electronic apparatus is placed on a level surface; and
   a swinging device connecting the back face of said box and said stand leg to each other, said swinging device allowing said stand leg to swing in relation to the back face of the box,
   wherein said swinging device includes:
      a locking mechanism for selecting an angle of said stand leg with respect to the back face of said box from a plurality of stages and locking the swinging of said stand leg at a selected stage;
      a swing pivot arranged in the one of said box and said stand leg; and
      a receiving portion arranged in the other one of said box and said stand leg, said receiving portion receiving said swing pivot;
   wherein the locking mechanism includes:
      a locking claw disposed in a distal end of said stand leg;
      a plurality of locking recesses formed in the back face of said box, each of the plurality of locking recesses allowing engagement with said locking claw; and
      a guide groove formed in the other one of said box and said stand leg which includes said receiving portion so that said guide groove is connected to said receiving portion, said guide groove allowing said swing pivot to move relative to said guide groove and preventing said swing pivot from moving when said locking claw is engaged with a selected locking recess of said plurality of locking recesses; and
   wherein said guide groove includes:
      a main groove portion extending in a direction orthogonal to an axis of said swing pivot to allow said swing pivot to move in the orthogonal direction, the orthogonal direction coinciding with a direction in which said locking claw is engaged with said selected locking recess of said plurality of locking recesses; and
      a sub groove portion extending across said main groove portion, said sub groove portion preventing said swing pivot from moving in the orthogonal direction when receiving said swing pivot, said sub groove portion diverging laterally from said main groove portion, and said guide groove is arranged and dimensioned to allow said swing pivot, which is in a perpendicular insertion position relative to the bottom of the main groove portion, to shift from said main groove portion to said sub groove portion so that said sub groove portion receives said swing pivot, while keeping the swing pivot in the perpendicular insertion position.

2. The electronic apparatus according to claim 1, wherein said plurality of locking recesses are radially arranged around the axis of said swing pivot.

3. The electronic apparatus according to claim 1, further comprising:
   a first wall-hanging device disposed in said back face of said box, said first wall-hanging device allowing said box to be hung on a wall; and
   a second wall-hanging device disposed in said stand leg, said second wall-hanging device allowing said box to be hung on the wall.

4. The electronic apparatus according to claim 3, wherein said first wall-hanging device includes a wall-hanging hole formed in the back face of said box, and said second wall-hanging device includes a wall-hanging hole formed in a face of said stand leg, which is opposed to the back face of said box.

5. The electronic apparatus according to claim 4, wherein said stand leg has a locking tongue for insertion into said box when in a rest position where said stand leg is set against the back face of said box.

6. The electronic apparatus according to claim 1, wherein said guide groove is L-shaped.

7. The electronic apparatus according to claim 1, wherein said guide groove is T-shaped.

8. The electronic apparatus according to claim 1, wherein said guide groove has a recess formed in a bottom where movement of said swing pivot is to be prevented by said locking mechanism, and the recess is configured to receive a tip end of said swing pivot.

* * * * *